United States Patent [19]
Scott

[11] Patent Number: 5,431,525
[45] Date of Patent: Jul. 11, 1995

[54] RECREATIONAL VEHICLE CARRIER

[76] Inventor: Richard C. Scott, 13632 12th Ave. S., Seattle, Wash. 98168

[21] Appl. No.: 182,860

[22] Filed: Jan. 18, 1994

[51] Int. Cl.6 .......................... B60P 3/06; B60R 9/00
[52] U.S. Cl. .................................. 414/538; 414/537; 296/61
[58] Field of Search ............... 414/537, 538, 558, 571, 414/480, 491, 494, 679; 224/310, 314; 14/71.1; 410/3, 24, 24.1, 29; 296/61; 193/38

[56] References Cited

U.S. PATENT DOCUMENTS

| | | | |
|---|---|---|---|
| 2,135,301 | 11/1938 | Dondlinger | 280/33.2 |
| 2,765,938 | 10/1956 | Di Addezio | 214/85.1 |
| 3,613,919 | 10/1971 | Ceepo | 214/85.1 |
| 3,677,425 | 7/1972 | Patten | 214/85.1 |
| 3,690,717 | 9/1972 | Taylor | 296/1 A |
| 3,704,794 | 12/1972 | Flamm | 410/3 X |
| 3,726,423 | 4/1973 | Miron | 414/538 X |
| 3,734,322 | 5/1973 | Vaillancourt | 414/538 X |
| 3,737,058 | 6/1973 | Johnson | 296/61 X |
| 3,777,921 | 12/1973 | Nelson | 414/538 X |
| 3,902,613 | 9/1975 | Newland | 214/85.1 |
| 3,941,064 | 3/1976 | Choly | 105/368 |
| 3,970,203 | 7/1976 | Watson, Jr. | 414/538 |
| 3,977,545 | 8/1976 | Lloyd | 296/61 X |
| 4,368,002 | 1/1983 | Krzyzosiak, Jr. | 414/494 |
| 4,418,813 | 12/1983 | Leinenger | 193/38 X |
| 4,420,165 | 12/1983 | Goodin | 280/414.1 |
| 4,624,619 | 11/1986 | Uher | 296/61 X |
| 4,749,317 | 6/1988 | Daniel | 410/26 |
| 4,880,250 | 11/1989 | Cravens et al. | 280/414.1 |
| 4,917,557 | 4/1990 | Kato et al. | 414/229 |
| 4,954,038 | 9/1990 | Sheahan | 414/494 X |
| 5,080,541 | 1/1992 | Andre | 410/24.1 |
| 5,232,329 | 8/1993 | Livingston | 414/494 |

FOREIGN PATENT DOCUMENTS

| | | | |
|---|---|---|---|
| 2104583 | 9/1971 | Germany | 193/38 |
| 2713223 | 10/1977 | Germany | 193/38 |

Primary Examiner—Michael S. Huppert
Assistant Examiner—Stephen Gordon
Attorney, Agent, or Firm—Teresa J. Wiant

[57] ABSTRACT

The present invention provides a recreational vehicle carrier (10) for use on a truck (14) for loading, transporting, and unloading two recreational vehicles (12). The carrier (10) includes a frame (22), a loading ramp (26), a bed ramp (24), and an elevated cage (20). The loading ramp (26), the bed ramp (24), and the elevated cage (20), are positioned in a top loading position for loading a recreational vehicle onto the elevated cage (20). Then, the elevated cage (20) and the bed ramp (24) are positioned in a carry position and a second recreational vehicle (12) is loaded onto the bed ramp (24). The loading ramp (26) is then slidable into a stowed position underneath the bed ramp (24) for transport.

4 Claims, 5 Drawing Sheets

RECREATIONAL VEHICLE CARRIER

TECHNICAL FIELD

This invention relates to a carrier for use with a truck. More particularly, this invention relates to a carrier for transporting two recreational vehicles on a truck.

BACKGROUND OF THE INVENTION

The following United States patents show various types of recreational vehicle carriers for transporting more than one vehicle: U.S. Pat. Nos. 3,677,425, granted Jul. 18, 1972, to Dan H. Patten; 3,902,613, granted Sep. 2, 1975, to Norman R. Newland; 4,420,165, granted Dec. 13, 1983, to William K. Goodin; 4,749,317, granted Jun. 7, 1988, to Phillip G. Daniel; and 4,880,250, granted Nov. 14, 1989, to Timothy J. Cravens et al.

DISCLOSURE OF THE INVENTION

The present invention provides a carrier for use with a truck having a cab and a bed. The carrier is sized for loading, transporting, and unloading two recreational vehicles. The carrier comprises a loading ramp, an elevated cage, a bed ramp, and a frame. The loading ramp is slidable between a loading position and a stowed position. The loading position places the loading ramp between the truck bed and ground level. The stowed position places the loading ramp substantially parallel to the bed. The elevated cage is positioned above the bed and is sized for receiving a recreational vehicle. The cage is pivotable between a loading position and a hauling position. The loading position places the cage toward the bed and the hauling position places the cage substantially parallel to the bed. The bed ramp is sized for receiving a recreational vehicle. The bed ramp is positionable between a top loading position and a hauling position. The top loading position places the bed ramp in contact with the loading ramp in the loading position and the elevated cage in the loading position. The hauling position places the bed substantially parallel to the bed of the truck. The frame has a bed frame portion, a forward frame portion, a top frame portion, and diagonal braces. The bed frame portion supports the bed ramp in the hauling position and the loading ramp in the stowed position. The forward frame portion supports the top frame portion. The top frame portion supports the elevated cage in the loading position and the hauling position. The diagonal braces support the bed ramp in the top loading position and the elevated cage in the top loading position. To load a first recreational vehicle onto the carrier, the loading ramp is positioned in the loading position, the bed ramp is positioned in the top loading position, and the elevated cage is positioned in the loading position. Then, the first vehicle is placed on the elevated cage from ground level by passing over, in series, the loading ramp, the bed ramp and into the cage. Then, the elevated cage is pivoted into the hauling position and the bed ramp is positioned into the hauling position. A second vehicle is loaded onto the bed ramp from the ground level by passing over the loading ramp and into the bed ramp.

In a preferred form of the invention, the elevated cage includes a locking mechanism which is operable for securing the elevated cage in a loading position and a hauling position. The locking mechanism is adaptable for being biased in a locking position when the elevated cage is in a loading position and the bias of the locking mechanism in the locking position is operable for being overcome by a force on the elevated cage. As a vehicle is passing over the elevated cage, the force of the vehicle on the locking mechanism forces the locking mechanism out of the locking position and the elevated cage pivots into its hauling position. The carrier may further include a damping cylinder connected between the frame and the elevated cage. The damping cylinder is operable for regulating the speed at which the elevated cage pivots.

In another preferred form of the invention, the loading ramp, the bed ramp, and the elevated cage include lubricated track portions.

In yet another preferred form of the invention, the frame comprises a transverse stop between the bed ramp and the loading ramp when the bed ramp is in the top loading position and the loading ramp is in the loading position. The transverse stop further includes a slide which is operable for easing passage of a vehicle over the transverse stop during loading or unloading of the vehicle.

These and other advantages and features will become apparent from the detailed description of the best mode for carrying out the invention that follows.

BRIEF DESCRIPTION OF THE DRAWINGS

Like reference numerals are used to indicate like parts throughout the various figures of the drawing, wherein.

BEST MODE FOR CARRYING OUT THE INVENTION

Figure 1:
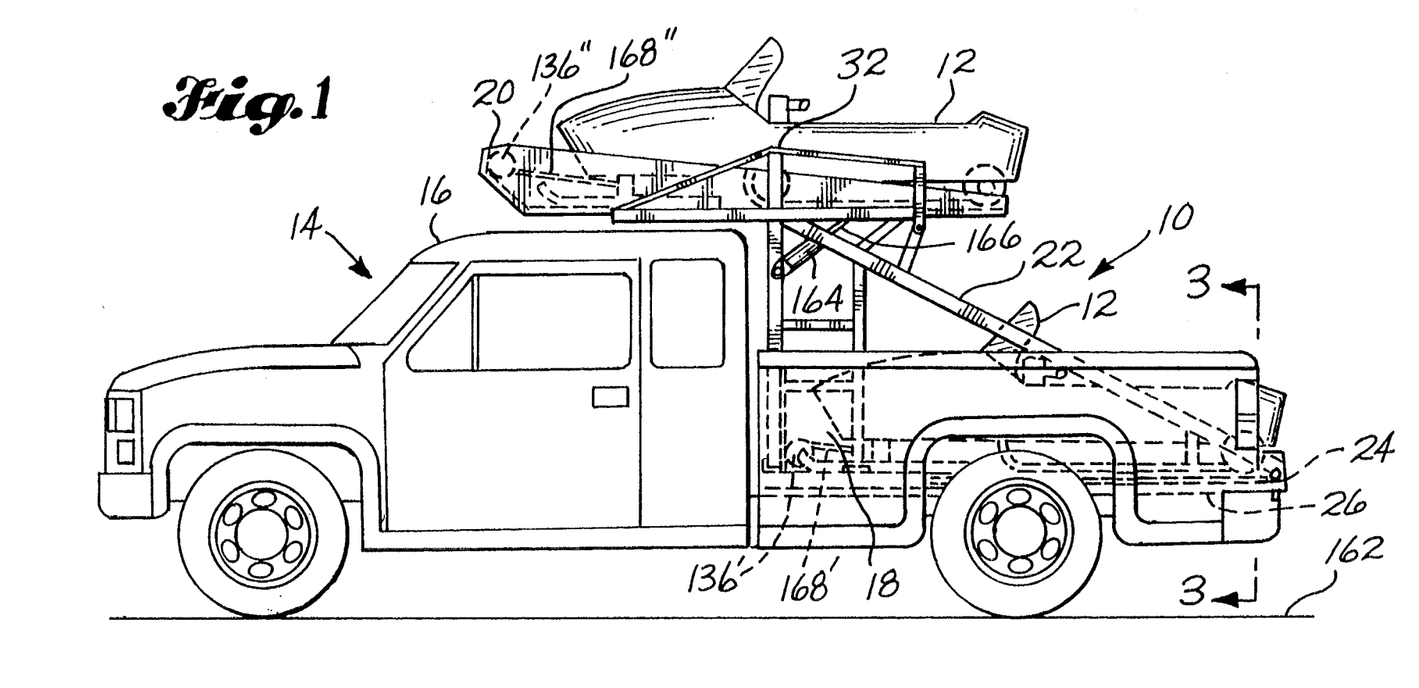
FIG. 1 is a side elevational view of a recreational vehicle carrier according to the present invention mounted on a truck with two recreational vehicles loaded onto the carrier.
Figure 2:
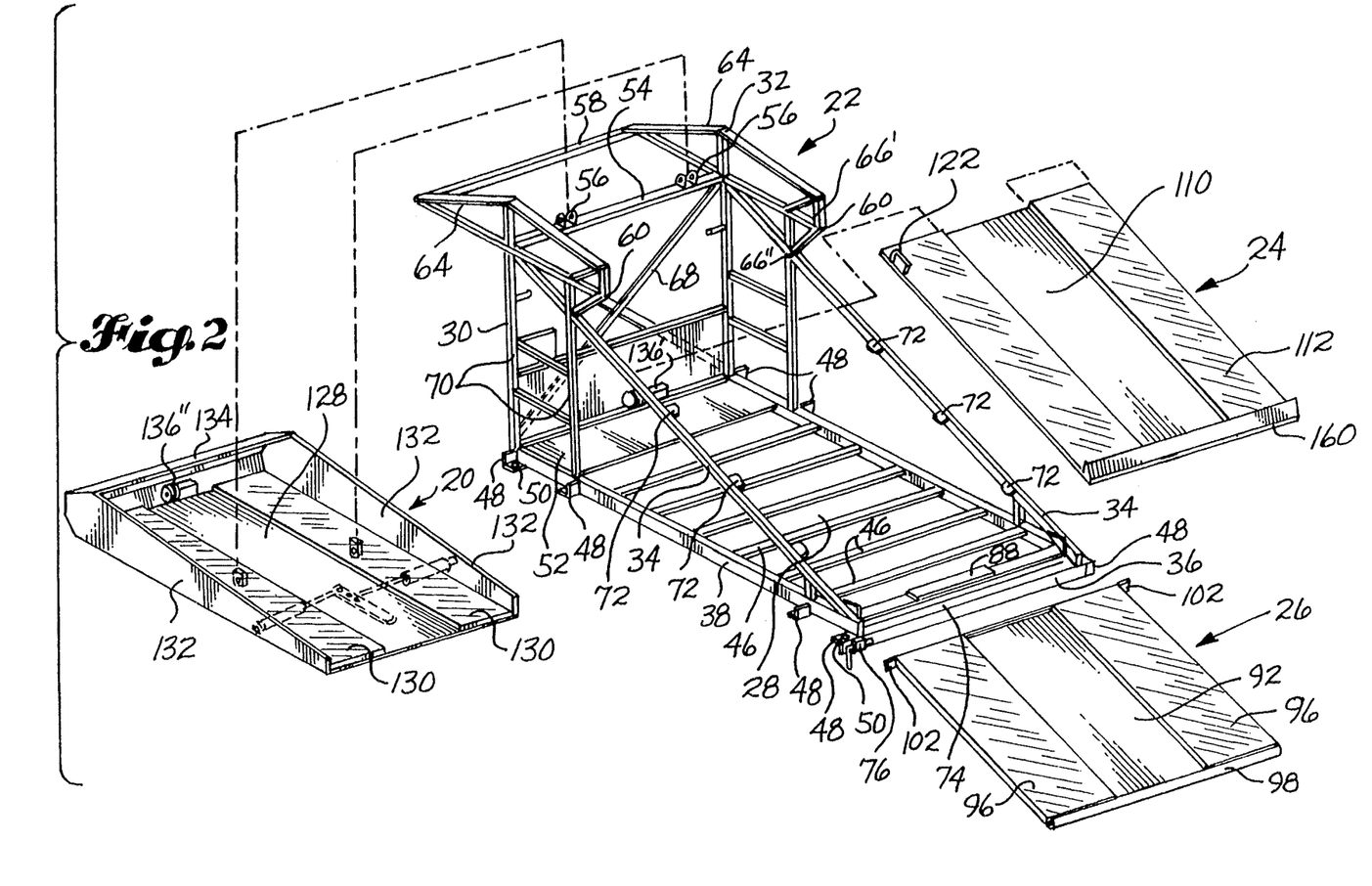
FIG. 2 is an exploded pictorial view of the carrier shown in FIG. 1.

Referring first to FIG. 1, the present invention provides a recreational vehicle carrier 10 which is sized for loading, transporting, and unloading two recreational vehicles 12 on a truck 14, wherein the truck 14 has a cab 16 and a truck bed 18. The recreational vehicle carrier 10 includes an elevated cage 20, a frame 22, a bed ramp 24, and a loading ramp 26, as illustrated in FIGS. 1 and 2. The elevated cage 20, the bed ramp 24, and the loading ramp 26 mount on the frame 22. The frame 22 mounts on the truck bed 18 and extends partially over the cab 16 of the truck 14, as illustrated in FIG. 1. The frame 22 includes a bed frame portion 28, a forward frame portion 30, a top frame portion 32, and diagonal braces 34 which extend from a rear portion 36 of the bed frame portion 28 to the top frame portion 32.

Figure 3:
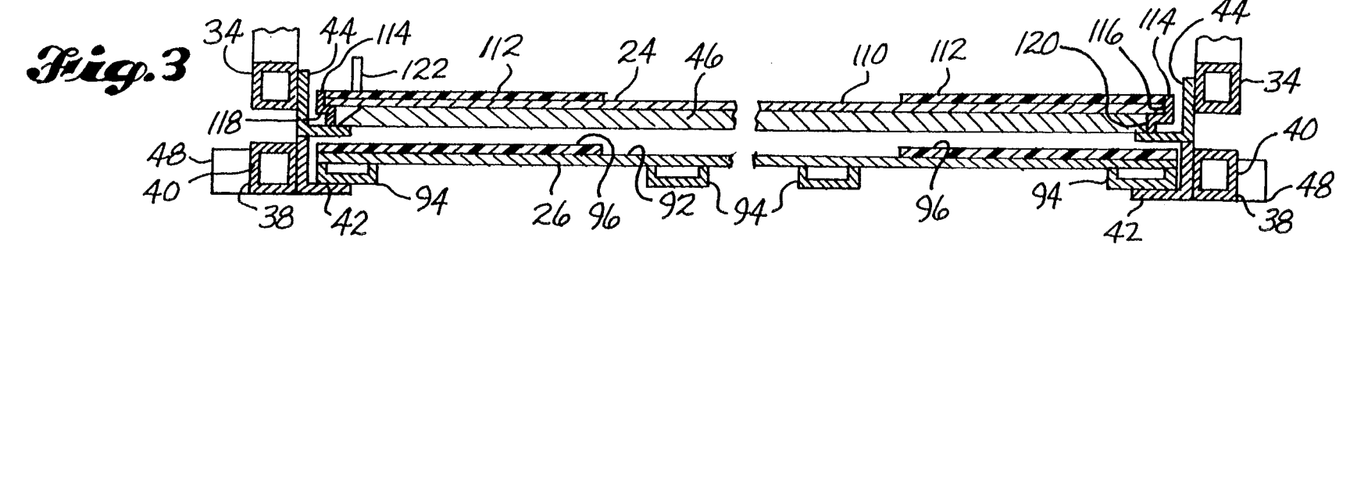
FIG. 3 is a fragmentary, sectional view of the carrier of the present invention taken across line 3—3 in FIG. 1.

Referring to FIGS. 2 and 3, the bed frame portion 28 includes two longitudinal members 38 extending longitudinally of the truck bed 18. A winch receiving platform 52 is connected to the longitudinal members 38 at a forward portion of the bed frame portion 28. Each longitudinal member 38 includes a tubular member 40 attached to a lower angle iron 42. An upper angle iron 44 is attached to the lower angle iron 42. A plurality of transverse members 46 span between and connect to the longitudinal members 38 at the upper angle irons 44. The angle irons 42, 44 are sized for receiving the loading ramp 26 on the lower angle iron 42, below the upper angle iron 44, when the loading ramp 26 is in a carry or hauling position. Mounting angle irons 48 are connected to the tubular members 40 of the longitudinal members 38. Each mounting angle iron 48 includes a fastener receiving opening 50.

Figures 6, 7, 8:
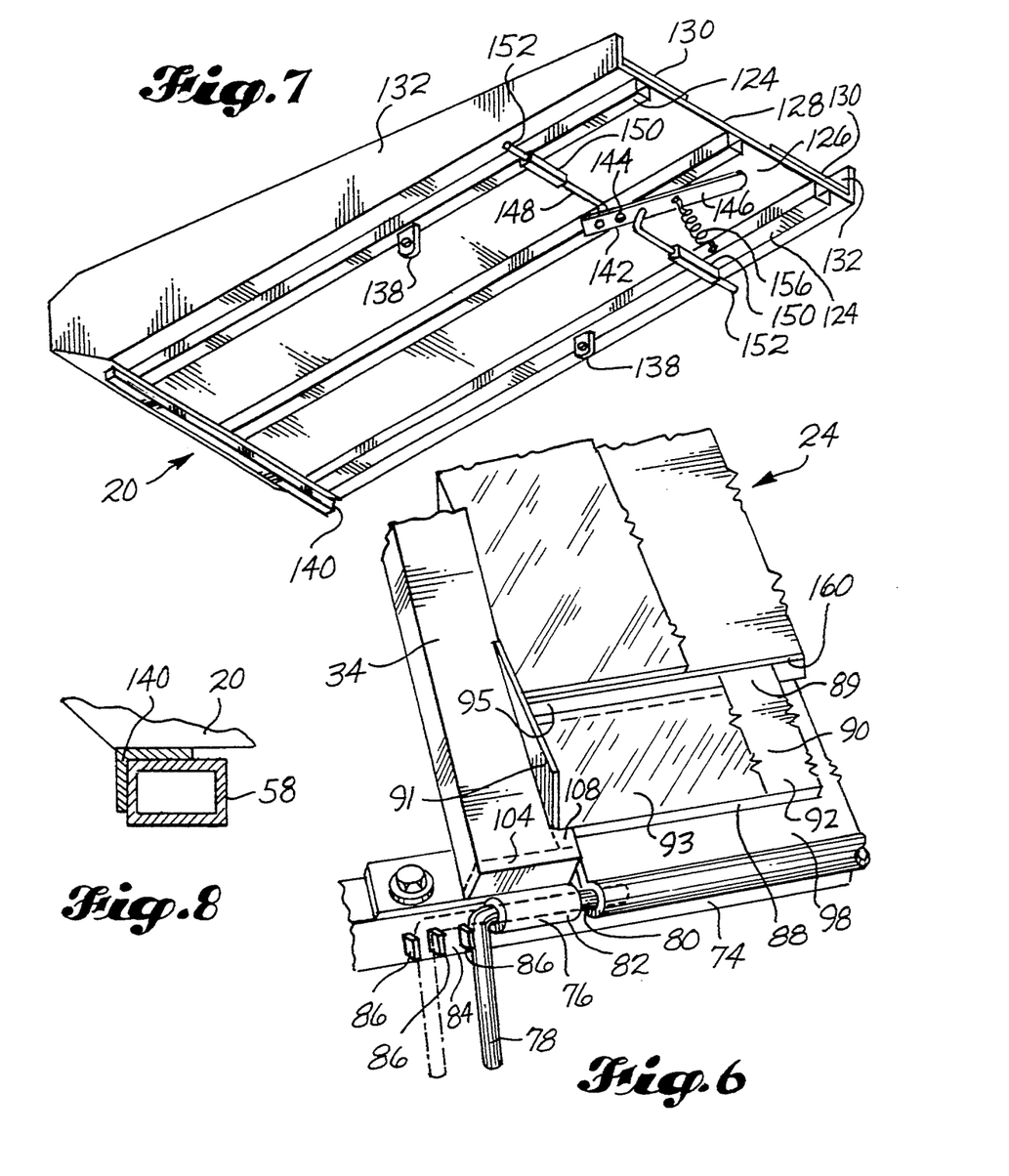
FIG. 6 is a fragmentary, pictorial view of the loading ramp, frame, and bed ramp of the carrier illustrated in FIGS. 1-5.
FIG. 7 is a pictorial view of an elevated cage of the carrier illustrated in FIGS. 1-6.
FIG. 8 is a fragmentary, sectional view of the elevated cage and loading ramp of the carrier of the present invention.

Referring to FIGS. 2 and 6, the bed frame portion 28 includes a rear transverse member 74 below the tubular members 40. A ramp lock 76 is mounted on the rear transverse member 74. The ramp lock 76 includes a lock handle 78 and a lock pin 80 which is slidable between a locked position, illustrated in FIG. 6, and an unlocked position, illustrated in phantom in FIG. 6. The lock pin 80 and lock handle 78 are held against vertical movement by a pin receiving member 82. The unlocked and locked positions of the lock pin 80 and lock handle 78 are defined by notches 84 which receive a portion of the lock handle 78 in the looked and unlocked positions. The notches 84 are defined by raised portions 86 formed on the rear transverse member 74.

Referring to FIGS. 2 and 6, a transverse stop 88 is mounted between the diagonal braces 34 and the longitudinal members 38, adjacent the rear transverse member 74. The transverse stop 88 includes a stop surface 89, shown in phantom in FIG. 6, and an upper surface 90. Guides 91 are mounted adjacent the transverse stop 88. Slides 93 are mounted on the upper surface 90 of the transverse stop 88. Each slide 93 includes a beveled edge 95. When a vehicle 12 is being moved over the bed ramp 24 and the loading ramp 26, the beveled edges 95 of the slides 93 provide a smooth transition for the vehicle 12 as the vehicle 12 passes over the transverse stop 88 such that the vehicle 12 does not become lodged upon the transverse stop 88.

Figure 4:
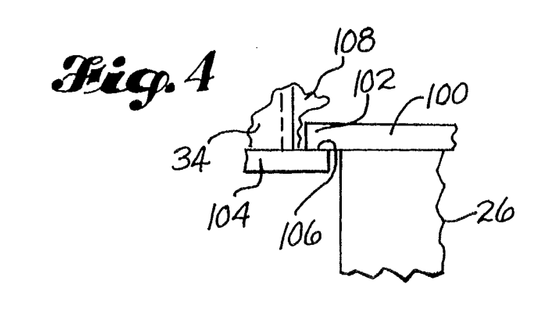
FIG. 4 is a top fragmentary view of a loading ramp and frame of the carrier illustrated in FIGS. 1-3.

As illustrated in FIGS. 4 and 6, each tubular shaped diagonal brace 34 includes an end cap 104 on the end of the diagonal brace 34, adjacent the rear transverse member 74. Each cap 104 extends beyond the width of the diagonal brace 34 to form an abutting surface 106. An inner cap 108 is attached to each diagonal brace 34 and end cap 104.

Referring to FIG. 2, the top frame portion 32 includes a transverse support member 54 with pivot pin connectors 56 spaced along a central portion of the transverse support member 54. A forward support member 58 extends substantially parallel to the transverse support member 54 at a forward portion of the frame 22. Locking brace members 60 extend from the diagonal braces 34 to top brace portions 64. An end pin opening 66' is formed at the top of each locking brace member 60 and an end pin opening 66" is formed at the bottom of each locking brace member 60.

The top frame portion 32 is connected to the bed frame portion 28 by a forward frame portion 30 which includes back braces 68 and side braces 70 at the forward and side edges of the winch receiving platform 52. The diagonal braces 34 also connect the bed frame portion 28 to the top frame portion 32. Angle irons are mounted on the diagonal braces 34 to provide inwardly extending tabs 72.

Referring to FIGS. 2, 3, and 6, the loading ramp 26 has a load receiving surface 92 mounted on a plurality of loading ramp tubular support members 94. Track strips 96 are secured to the load receiving surface 92 and extend longitudinally of the loading ramp 26.

A tubular pin receiving portion 98 is located at a rear portion of the loading ramp 26, adjacent the load receiving surface 92. The loading ramp 26 includes an elongated member 100 at a forward portion of a loading ramp 26 which extends transversely beyond the load receiving surface 92 to form a flange 102 on either side of the loading ramp 26. The end cap 104 and the inner cap 108 are adapted for receiving each flange 102 against each abutting surface 106 when the loading ramp 26 is in a loading position.

Figure 5:
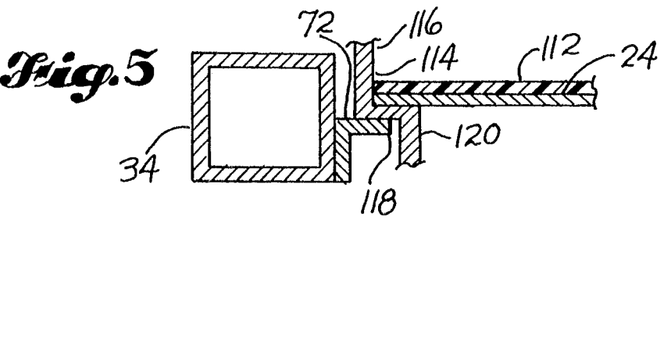
FIG. 5 is a fragmentary, sectional view of a bed ramp and frame of the carrier illustrated in FIGS. 1-4.

Referring to FIGS. 2, 3, and 5, the bed ramp 24 has a bed load receiving surface 110 with track strips 112 extending longitudinally of the bed ramp 24 and end irons 114 which have an upper leg 116, a web 118, and a lower leg 120. Track strips 96, 112 are made from a self-lubricated sheet, structural plastic material such as UHMW, or high density polyethylene, for example. The bed ramp 24 includes a handle 122 for positioning the bed ramp 24 on the frame 22. In a top loading or loading position, the bed ramp 24 is positioned with each web 118 of each end iron 114 contacting tabs 72 on the diagonal brace 34, as illustrated in FIG. 5. In a carry or hauling position, the bed ramp 24 is positioned atop the transverse members 46 substantially parallel with the bed 18 of the truck 14, as illustrated in FIG. 3.

Referring to FIGS. 2 and 7, the elevated cage 20 includes tubular support members 124 extending longitudinally of the elevated cage 20. Pivot pin receiving portions 138 are attached to the tubular support members 124. A floor 126, which includes a top load receiving surface 128, is attached to the tubular support member 124. Lubricated track portions 130 are attached to the floor 126 and extend longitudinally of the elevated cage 20 along the top load receiving surface 128. Sidewalls 132 extend upwardly from the side edges of the floor 126. A front wall 134 extends upwardly from a front portion of the elevated cage 20.

A bracing angle iron 140 is attached to a forward portion of the floor 126. When the elevated cage 20 is in a hauling or carry position, the bracing angle iron 140 of the elevated cage 20 is in contact with and supported by the forward support member 58, as illustrated in FIGS. 1 and 8.

Referring to FIG. 7, a locking mechanism 142 is attached by a fastener 144 to one of the tubular support members 124. The locking mechanism 142 includes a swing arm 146 with two legs 148 attached to the swing arm 146. Blocks 150 are mounted on the legs 148. End pins 152 are formed at the ends of the legs 148. A spring 156 is attached to the swing arm 146 and a tubular support member 124. The spring 156 biases the swing arm 146 into an offset position, as illustrated in FIG. 7. When the swing arm 146 is moved into a center position, the end pins 152 on the legs 148 swing and move inwardly, away from the sidewalls 132.

The carrier 10 of the present invention is assembled in the following manner. The frame 22 is positioned on the truck bed 18 of the truck 14 with a portion of the top frame portion 32 extending over the cab 16 of the truck 14, as illustrated in FIG. 1. Fasteners, such as bolts (not shown), are inserted through the openings 50 in the mounting angle irons 48 and into the truck bed 18 of the truck 14, so as to fasten the frame 22 onto the truck bed 18. The elevated cage 20 is mounted on the frame 22 by inserting pins (not shown) through the pivot pin receiving portions 138 on the elevated cage 20 and the pivot pin connectors 56 on the frame 22. Each pivot pin is secured by a nut (not shown).

The loading ramp 26 is mounted on the frame 22 by inserting the forward end of the loading ramp 26 which includes the elongated member 100 into the opening formed between the lower angle iron 42 and the upper angle iron 44. For installation, the loading ramp 26 is tilted relative to the frame 22 so that the elongated member 100 will clear the end cap 104 and the inner cap 108 of the diagonal braces 34. When the elongated member 100 is forward of the end cap 104 and the inner cap 108, the loading ramp 26 is straightened relative to the frame 22, such that when the loading ramp 26 is pulled backwards, away from the frame 22, the flanges 102 of the elongated member 100 are caught against the abutting surfaces 106 of the end cap 104 and inner cap 108, as illustrated in FIG. 4. The bed ramp 24 is placed into a loading position by placing the bed ramp 24 on the bed frame portion 28 with the end irons 114 contacting the tabs 72 on the frame 22, as illustrated in FIG. 5. A lower end surface 160 of the bed ramp 24 is placed against the stop surface 89 of the transverse stop 88. The bed ramp 24 is placed into a hauling or carry position by pulling upwardly on the handle 122 of the bed ramp 24 such that the bed ramp 24 is tilted relative to the frame 22. In the tilted position, the bed ramp 24 is lowered onto the bed frame portion 28 of the frame 22 with the bed ramp 24 clearing the tabs 72 on the frame 22. The bed ramp 24 is placed on the transverse members 46, as illustrated in FIG. 3, when in a hauling or carry position, substantially parallel to the truck bed 18.

A winch 136' is mounted on the winch receiving platform 52 and a winch 136'' is mounted on a front portion of the elevated cage 20, adjacent the front wall 134.

A damping cylinder 164 is mounted on each side brace 70 of the frame 22 with a rod 166 of each damping cylinder 164 attached to the floor 126 of the elevated cage 20.

Figure 9:
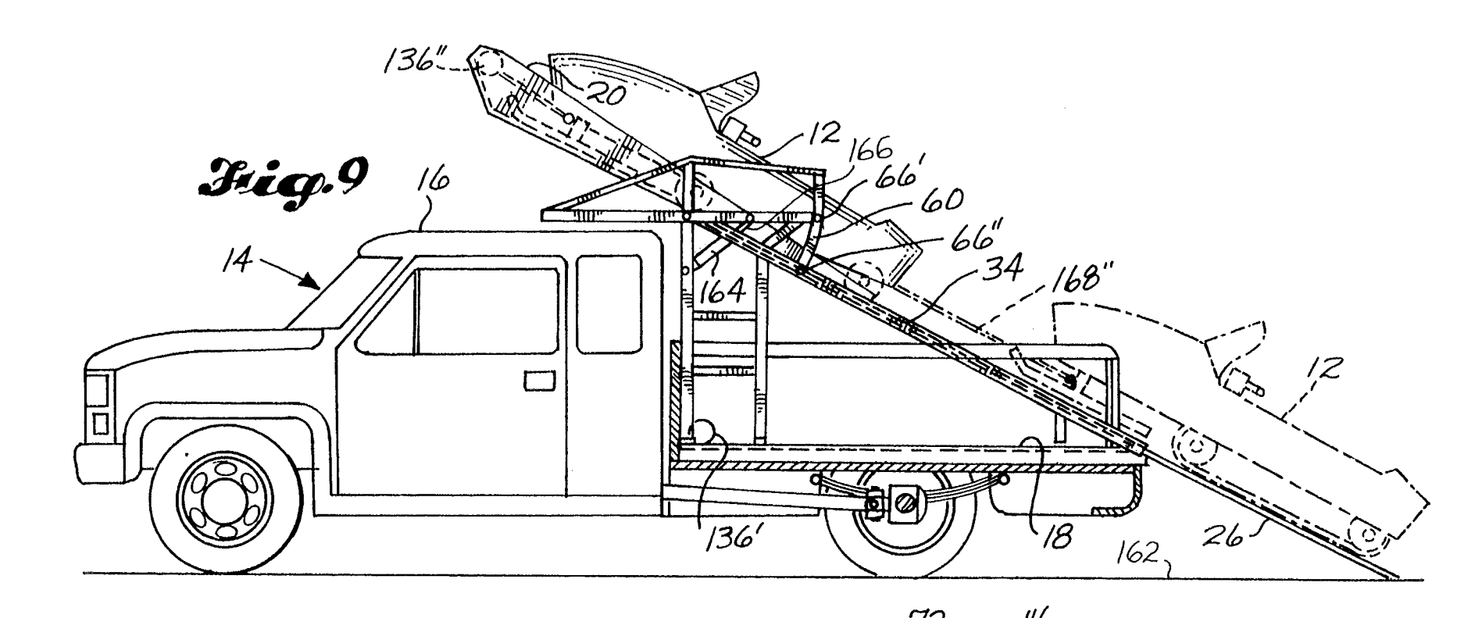
FIG. 9 is a side, elevational partial cutaway view of the carrier and truck as illustrated in FIGS. 1-8 with the elevated cage and bed ramp in top loading positions, and the loading ramp in loading position and the progress of a recreational vehicle onto the carrier shown in phantom.

To load two recreational vehicles 12 onto the carrier 10 of the present invention, the carrier 10 is positioned as shown in FIG. 9. The elevated cage 20 is positioned in a top loading position by pulling the swing arm 146 of the locking mechanism 142 into a center position such that the end pins 152 of the locking mechanism 142 are pulled away from the end pin openings 66' in the top brace portions 64. Then, the elevated cage 20 is pulled such that it pivots about the pivot pin connectors 138, 56. As the elevated cage 20 pivots, the end pins 152 of the locking mechanism 142 are in contact with the locking brace members 60. Each damping cylinder 164 regulates the speed at which the elevated cage 20 tilts. The elevated cage 20 continues to tilt until the end pins 152 are aligned with the lower end pin openings 66'' and the elevated cage 20 is supported by the diagonal braces 34. Then, with the spring 156 biasing the swing arm 146 into an offset position, the end pins 152 are snap-fit into the lower end pin openings 66''. With the end pins 152 in the lower end pin openings 66'', the elevated cage 20 is secured in the tilted loading position.

The bed ramp 24 is positioned in a top loading position by grasping the handle 122 and pulling the bed ramp 24 upwardly while tilting the bed ramp 24, until the bed ramp 24 is received on the tabs 72, as illustrated in FIG. 5. The lower end surface 160 of the bed ramp 24 is securely positioned against the stop surface 89 of the transverse stop 88, as illustrated in FIG. 6. The loading ramp 26 is positioned in a loading position by moving the lock handle 78 on the ramp lock 76 into the unlock position with the lock pin 80 outside of the tubular pin receiving portion 98, as illustrated in FIG. 6. Then, the end of the loading ramp 26 adjacent the tubular pin receiving portion 98 is grasped and moved outwardly away from the frame 22 until the flanges 102 on the front portion of the loading ramp 26 contact the abutting surfaces 106 of the end caps 104, as illustrated in FIG. 4, and the loading ramp 26 pivots about the flanges 102 until the rear portion of the loading ramp 26, adjacent the tubular pin receiving portion 98, is received on the ground 162.

A cable 168'' from the winch 136'' on the elevated cage 20 is fastened to a front portion of a first recreational vehicle 12. The winch 136'' is then operated to pull the recreational vehicle 12 from ground level 162 up the loading ramp 26, over the slides 93, the bed ramp 24, and onto the elevated cage 20. As the recreational vehicle 12 passes onto the elevated cage 20 and over the pivot pin connectors 56, 138 of the elevated cage 20, the weight of the recreational vehicle 12 on the forward portion of the elevated cage 20 overcomes the force of the locking mechanism 142 holding the end pins 152 in the lower end pin openings 66''. As the force of the recreational vehicle 12 overcomes the force of the locking mechanism 142, the elevated cage 20 tilts upwardly and the end pins 152 of the locking mechanism 142 are snapped out of engagement with the end pin openings 66''. With the end pins 152 removed from the lower end pin openings 66'', the elevated cage 20 pivots about the pivot pin connectors 56, 138 with each damping cylinder 164 regulating the speed at which the elevated cage 20 pivots toward a hauling or carry position.

Figure 10:
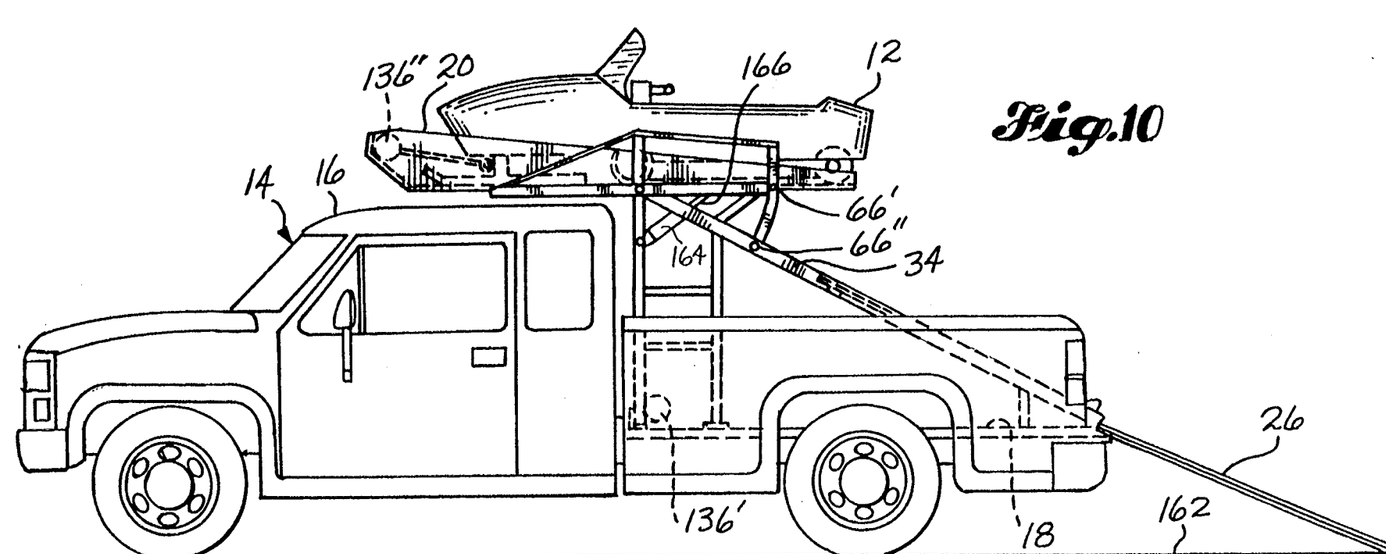
FIG. 10 is a side, elevational view of the carrier and truck illustrated in FIGS. 1-9 with a recreational vehicle mounted on the elevated cage and the elevated cage in a carry position.

As the elevated cage 20 pivots upwardly, the spring 156 on the locking mechanism 142 biases the swing arm 146 into an offset position and presses the end pins 152 against the locking brace members 60. As the elevated cage 20 pivots into a hauling position, the end pins 152 are brought into alignment with the upper end pin openings 66'. With the spring 156 biasing the locking mechanism 142, the end pins 152 are snap-fit into the upper end pin openings 66'; locking the elevated cage 20 in the hauling position, with the elevated cage 20 substantially parallel to the truck bed 18, as illustrated in FIG. 10.

Once the recreational vehicle 12 is positioned in on the elevated cage 20, the winch 136'' is deactivated. The recreational vehicle 12 on the elevated cage 20 may be fastened to the elevated cage 20 by suitable cables or ropes. Then, the bed ramp 24 is positioned into a hauling or carry position by pulling upwardly on the handle 122 and tilting the bed ramp 24 and then lowering the bed ramp 24 onto the frame 22 such that the bed ramp 24 is substantially parallel with the truck bed 18. Then, a cable 168' from the winch 136' on the winch receiving platform 52 is connected to the second recreational vehicle 12. The winch 136' is operated to pull the second recreational vehicle 12 from ground level 162, up the loading ramp 26 and onto the bed ramp 24, as illustrated in FIG. 1. The second recreational vehicle 12 may be fastened or secured to the bed ramp and frame 22 by any suitable cables or ropes. The loading ramp 26 is positioned in a carry or stowed position by lifting upwardly on a rear portion of the loading ramp 26, adjacent the tubular pin receiving portion 98 and pushing the loading ramp 26 into the frame 22, until the loading ramp 26 is received on the lower angle iron 42 below the upper angle iron 44, as illustrated in FIG. 3. The loading ramp 26 is secured in the stowed position by positioning the ramp lock 76 in a lock position, as illustrated in FIG. 6.

To unload the recreational vehicles 12 from the carrier 10, the ramp lock 76 on the loading ramp 26 is positioned into an unlock position, as illustrated in phantom in FIG. 6. The loading ramp 26 is pulled outwardly until the flanges 102 on a forward portion of the loading ramp 26 contact the abutting surfaces 106 of the end cap 104 and the loading ramp 26 is pivoted about the flanges 102 until the rear portion of the loading ramp 26, adjacent the tubular pin receiving portion 98, is received on the ground 162. The tie down or fasteners connected to the recreational vehicle 12 on the bed ramp 24 are unfastened and the winch 136' connected to the recreational vehicle 12 is activated and the recreational vehicle 12 is backed off of the bed ramp 24, down the loading ramp 26 and onto the ground 162.

To unload the recreational vehicle 12 on the elevated cage 20, the bed ramp 24 is placed into the top loading position by pulling upwardly on the handle 122 to tilt the bed ramp 24 and pull the bed ramp 24 above the tabs 72 until the bed ramp 24 rests on the tabs 72 and against the stop surface 89 of the transverse stop 88, as illustrated in FIGS. 5 and 6. Then, the swing arm 146 of the locking mechanism 142 is swung into a centered position such that the end pins 152 are removed from the upper end pin openings 66'. The elevated cage 20 is pulled downwardly with the spring 156 on the locking mechanism 142 biasing the end pins 152 against the locking brace members 60 until the end pins 152 are aligned with the lower end pin opening 66" and the end pins 152 are snap fit into the lower end pin openings 66" by the spring 156 biasing the swing arm 146 into an offset position. Then, the winch 136" on the elevated cage 20 is activated and the ropes or fasteners securing the recreational vehicle 12 on the elevated cage 20 are removed. The recreational vehicle 12 is then lowered off of the elevated cage 20 by passing off of the elevated cage 20 and over the bed ramp 24. The vehicle 12 contacts the beveled edges 95 of the slides 93 and passes onto the slides 93, onto the loading ramp 26, and onto the ground level 162. The winch 136" on the elevated cage 20 is then de-activated and the cable 168 from the winch 136" is removed from the recreational vehicle 12.

The carrier 10 of the present invention is particularly useful for hauling snowmobiles. Preferably, the lubricated track portions 96 on the loading ramp 26, the lubricated track portions 112 on the bed ramp 24, and the lubricated track portions 130 on the elevated cage 20 are composed of a plastic material which is substantially unmarred by the track portions of a snowmobile passing over the lubricated portions 96, 112, 130. The frame 22 is preferably made substantially of steel which is welded together and the floor surfaces of the bed ramp 24, loading ramp 26, and elevated cage 20 are preferably composed substantially of aluminum.

The carrier 10 of the present invention may be utilized for hauling one recreational vehicle 12, either on the elevated cage 20 or on the bed ramp 24. Further, the carrier 10 of the present invention may be mounted on a trailer which is suitably adapted for carrying more than two recreational vehicles 12.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A carrier for use with a truck having a cab and a bed, said carrier being sized for loading, transporting, and unloading two recreational vehicles, comprising:

a loading ramp being slidable between a loading position and a stowed position, the loading position placing said loading ramp between the truck bed and ground level, the stowed position placing said loading ramp substantially parallel to the bed;

an elevated cage positionable above the bed and being sized for receiving a recreational vehicle, said cage being pivotable between a loading position and a hauling position, the loading position placing said cage toward the bed and the hauling position placing said cage substantially parallel to the bed;

a bed ramp being sized for receiving a recreational vehicle and being positionable between a top loading position and a hauling position, the top loading position placing said bed ramp in contact with said loading ramp in its loading position and said elevated cage in its loading position, the hauling position placing said bed ramp substantially parallel to the bed of the truck; and a frame having a bed frame portion, a forward frame portion, a top frame portion, and diagonal braces, said bed frame portion supporting said bed ramp in its hauling position and said loading ramp in its stowed position, said forward frame portion supporting said top frame portion, said top frame portion supporting said elevated cage in its loading position and its hauling position, and said diagonal braces supporting said bed ramp in its top loading position and said elevated cage in its loading position;

whereby to load a first vehicle onto said carrier, said loading ramp may be positioned in its loading position, said bed ramp may be positioned in its top loading position, and said elevated cage may be positioned in its loading position, such that said first vehicle may be placed on said elevated cage from ground level by passing over, in series, said loading ramp and said bed ramp, and then moved into said cage, said elevated cage may then be pivoted into its hauling position and said bed ramp may be positioned into its hauling position whereby a second vehicle may be loaded onto said bed ramp from ground level by passing over said loading ramp and moving onto said bed ramp; and wherein said elevated cage includes a locking mechanism is for securing said elevated cage in its loading position and its hauling position, said locking mechanism including biasing means for biasing said locking mechanism in a locking position when said elevated cage is in its loading position, the locking mechanism being configured such that the bias of the biasing means may be overcome by a downward force on the forward portion of said elevated cage, whereby as a vehicle passes over the elevated cage, the force of the passing vehicle on the elevated cage forces the locking mechanism out of its locking position and the elevated cage pivots into its hauling position.

2. The carrier of claim 1, further comprising a damping cylinder connected between the frame and the elevated cage, said damping cylinder being operable for regulating the speed at which the elevated cage pivots.

3. The carrier of claim 1, wherein said loading ramp, said bed ramp, and said elevated cage include track contacting portions of a self-lubricated structural plastic material.

4. A carrier for use with a truck having a cab and a bed, said carrier being sized for loading, transporting, and unloading two recreational vehicles, comprising:

a loading ramp being slidable between a loading position and a stowed position, the loading position placing said loading ramp between the truck bed and ground level, the stowed position placing said loading ramp substantially parallel to the bed;

an elevated cage positionable above the bed and being sized for receiving a recreational vehicle, said cage being pivotable between a loading position and a hauling position, the loading position placing said cage toward the bed and the hauling position placing said cage substantially parallel to said bed;

a bed ramp being sized for receiving a recreational vehicle and being positionable between a top loading position and a hauling position, the top loading position placing said bed ramp in contact with said loading ramp in its loading position and said elevated cage in its loading position, the hauling position placing said bed ramp substantially parallel to the bed of the truck; and a frame having a bed frame portion, a forward frame portion, a top frame portion, and diagonal braces, said bed frame portion supporting said bed ramp in the hauling position and said loading ramp in the stowed position, said forward frame portion supporting said top frame portion, said top frame portion supporting said elevated cage in the loading position and the hauling position, and said diagonal braces supporting said bed ramp in its top loading position and said elevated cage in its loading position;

whereby to load a first vehicle onto said carrier, said loading ramp may be positioned in its loading position, said bed ramp may be positioned in its top loading position, and said elevated cage may be positioned in its loading position, such that said first vehicle may be placed on said elevated cage from ground level by passing over, in series, said loading ramp and said bed ramp, and then moved into said cage, said elevated cage may then be pivoted into its hauling position and said bed ramp may be positioned into its hauling position whereby a second vehicle may be loaded onto said bed ramp from ground level by passing over said loading ramp and moving onto said bed ramp; and wherein said frame comprises a transverse stop between the bed ramp and the loading ramp when the bed ramp is in the top loading position and the loading ramp is in the loading position, said transverse stop further including a slide which is operable for easing passage of a vehicle over said transverse stop during loading or unloading of said vehicle.

* * * * *